United States Patent

[11] 3,587,126

| [72] | Inventors | Roderick B. Potter<br>Milwaukee;<br>Jack D. Slocum, Brown Deer, Wis. |
|---|---|---|
| [21] | Appl. No. | 875,268 |
| [22] | Filed | Nov. 10, 1969 |
| [45] | Patented | June 28, 1971 |
| [73] | Assignee | Kelley Company, Inc., Milwaukee, Wis. |

[54] HINGE CONSTRUCTION FOR JOINING THE LIP TO THE RAMP OF A DOCKBOARD
10 Claims, 5 Drawing Figs.

| [52] | U.S. Cl. | 14/71 |
|---|---|---|
| [51] | Int. Cl. | B65g 11/00 |
| [50] | Field of Search | 14/71, 72 |

[56] References Cited
UNITED STATES PATENTS

| 2,904,802 | 9/1959 | Hartman | 14/71 |
|---|---|---|---|
| 2,993,219 | 7/1961 | Pennington | 14/71 |
| 3,203,002 | 8/1965 | McGuire | 14/71 |
| 3,255,478 | 6/1966 | Lambert | 14/71 |

*Primary Examiner*—Jacob L. Nackenoff
*Attorney*—Andrus, Sceales, Starke and Sawall ABSTRACT: A dockboard to be installed on a loading dock and adapted to span the distance between the dock and the bed of a carrier. The dockboard included a ramp hinged at its rear edge to the dock, while an extension lip is hinged to the front edge of the ramp. The ramp is composed of a flat tread plate supported on a series of spaced parallel beams extending in a direction from the front to the rear of the ramp. Each beam includes a base flange connected by a vertical web to the tread plate, and the forward end of each base flange extends upwardly and is provided with a loop or reverse bend which receives a hinge pin. The hinge pin also extends through lugs attached to the undersurface of the lip and the hinge construction provides a greater load-supporting capacity at the joint between the lip and the ramp.

PATENTED JUN 28 1971

INVENTORS
Roderick B. Potter
Jack D. Slocum

BY Andrus, Sceales, Starke & Sawall

Attorneys

INVENTORS
Roderick B. Potter
Jack D. Slocum

Attorneys

HINGE CONSTRUCTION FOR JOINING THE LIP TO THE RAMP OF A DOCKBOARD

This invention relates to a dockboard to be installed on a loading dock, and more particularly to a hinge construction for joining an extension lip to the front edge of the ramp of the dockboard.

A common form of dockboard is installed in a shallow depression or pit in the upper surface of the dock. A dockboard of this type includes a ramp which is hinged at its rear edge to the back of the dock pit, and is adapted to be biased upwardly to an inclined position by a coil spring or other resilient means. When not in use, the ramp is locked, or held down, in a position generally flush with the upper surface of the dock by a manually releasable holddown mechanism.

The conventional pit-mounted dockboard also includes an extension lip hinged to the front edge of the ramp. When a truck or other carrier backs toward the dock, the operator releases the holddown mechanism so that the ramp will pivot upwardly to the inclined position. As a consequence of the upward pivotal movement of the ramp, a lip-extending mechanism is actuated to pivot the lip upwardly to a partially extended position. The operator then walks outwardly on the inclined ramp and his weight will overbalance the force of the spring to lower the ramp and move the lip into engagement with the bed of the carrier.

After the loading or unloading is completed, the carrier merely pulls away from the dock and the lip will pivot downwardly to its pendant position.

The ramp which is customarily employed in a dockboard includes a series of channel-shaped beams that extend in a direction from the front to the rear of the ramp. In addition, the conventional ramp includes a relatively heavy front plate which is welded to the front edges of the channel-shaped beams. In the conventional structure, a series of hinge sockets are welded to the front plate and a second series of cooperating hinge sockets are welded to the lip with a hinge pin extending through the aligned hinge sockets. During loading or unloading of the carrier, and particularly when a heavy item such as a forklift truck moves across the hinged joint between the ramp and lip, a tremendous moment is applied to the hinged joint which acts in a direction to tear the front plate away from the front edges of the support channels or tear the hinge socket from the front plate. Therefore it has been recognized that the hinge joint between the ramp and the lip is generally the weakest portion of the dockboard, and is the area where one would expect failure to occur under overloading conditions.

The present invention is directed to an improved hinged joint construction for connecting the extension lip to the ramp of a dockboard. In accordance with the invention, the tread plate of the ramp is supported on a series of parallel spaced beams which extend in a direction from the front to the rear of the ramp. Each beam includes a base flange which is connected by a vertical web to the tread plate and the forward end of each flange extends diagonally upwardly and is provided with a loop or reverse bend. The forward edge of the vertical web is provided with a slot within which the reversely bent or return portion of the flange is welded, or alternately the reverse bend may be slotted to receive the vertical web. A hinge pin extends through the loop in the flange as well as through openings in lugs attached to the underside of the lip to thereby provide a hinge connection for the lip to the ramp.

From a structural standpoint it is desired to subject the welds connecting the base flange and the web to pure shear stress under load. In the present invention the inclined portion of the flange, as well as the return portion of the flange, are spaced equidistant from the resultant force vector acting through the axis of the hinge pin so that the welds connecting the return portion and the inclined portion to the web are subjected entirely to shear stress as a load is applied to the ramp. This enables the hinge connection between the lip and the ramp to withstand greater loads than conventional constructions.

The construction of the invention also eliminates the necessity of a front plate which normally connects the front edges of the beams. Not only does this reduce the cost of the ramp, but it also shifts the center of gravity of the ramp toward the rear so that a lesser spring force is required to bias the ramp to the inclined position.

Other objects and advantages will appear in the course of the following description.

The drawings illustrate the best mode presently contemplated of carrying out the invention.

Figure 1:
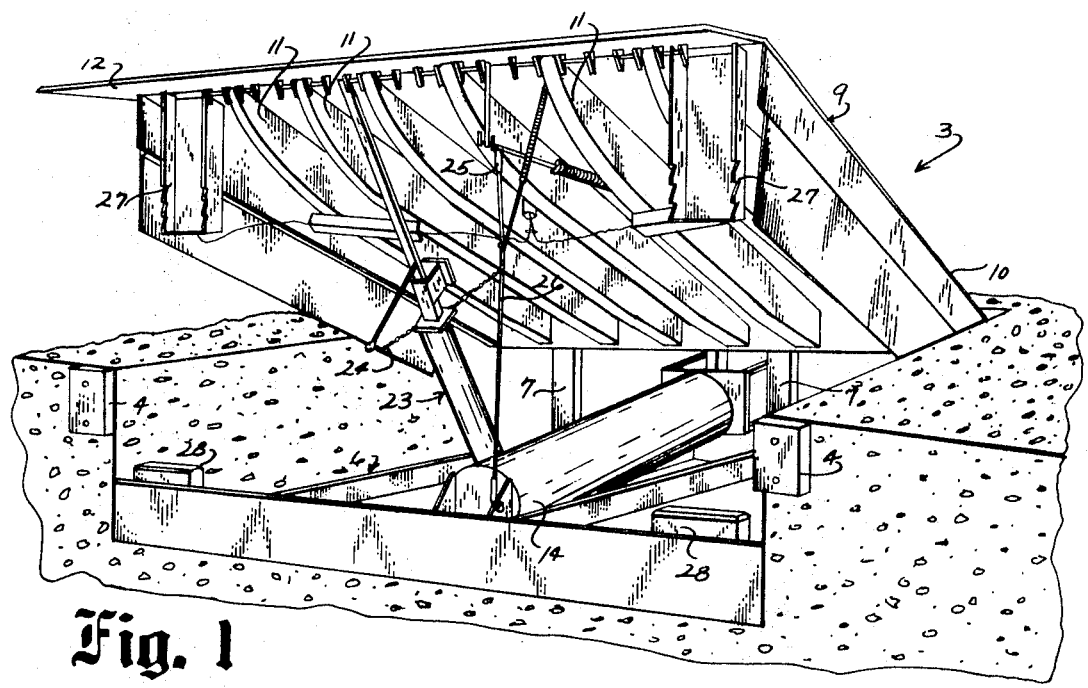
FIG. 1 is a perspective view of the dockboard of the invention with the ramp in upper inclined position.
Figure 2:
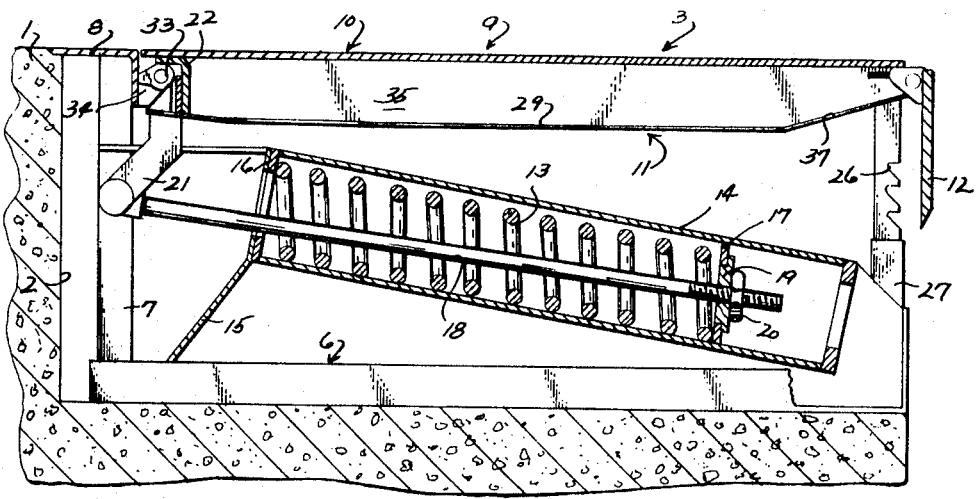
FIG. 2 is a vertical section of the dockboard with the ramp in the cross traffic position.

The drawings illustrate a loading dock 1 formed with a shallow pit or depression 2 and the dockboard 3 of the invention is installed in the pit. A pair of bumpers 4 are mounted on the front wall 5 of the dock on either side of the pit and serve to protect the dockboard as the truck or other carrier is backed toward the dock 1.

The dockboard 3 is provided with a structural mounting frame 6 which is mounted in the pit 2 and the rear portion of the frame includes a series of spaced vertical channels 7 that carry a horizontal angle 8. The upper flange of angle 8 is substantially flush with the upper surface of the dock 1.

Dockboard 3 also includes a ramp 9 and the rear edge of the ramp is pivotally connected to the angle 8 of frame 6. Ramp 9 is composed of a generally flat tread plate 10 which is supported by a series of parallel spaced beams 11. Hinged to the forward edge of the ramp 9 is an extension lip 12. In the storage or cross-traffic position, the lip 12 will assume a pendant position in which the lip hangs downwardly in front of the ramp. When the ramp 9 is pivoted upwardly to an inclined position, the extension lip will be automatically pivoted upwardly to a partially extended position, and as the ramp is walked downwardly the extension lip 12 will then be brought down into engagement with the bed of a carrier.

The ramp 9 is biased upwardly to an inclined position by a mechanism similar to that shown in copending U. S. Pat. application Ser. No. 770,054, filed Oct. 23, 1968. The biasing mechanism includes a coil spring 13 which is mounted within a tubular sleeve 14 secured to the frame 6 and extends in a fore-and-aft direction of the dockboard. The rear end of the sleeve 14 is connected by a supporting structure 15 to the channels 7 of frame 6 so that the sleeve 14, as well as the structure 15, are fixed to the dock. The inner end of the spring 13 seats against an end ring 16 in sleeve 14, while the outer end of the spring bears against a movable spring retainer 17 so that the force of the spring will act to move the spring retainer 17 toward the forward edge of the dock. A rod 18 is located centrally of the coil spring 13, and the forward end of the rod extends through a plug 19 attached to spring retainer 17 and is secured to the plug by means of a nut 20 which is threaded on the forward end of the rod. The rear end of the rod 18 projects beyond the rear end of the spring and is pivotally connected to the lower end of a lever arm 21, while the upper end of the lever arm is welded to an angle 22 on the inner edge of the ramp. With this construction, the force of the coil spring 13 acts to move the rod 18 forwardly and thereby pivot the lever arm 21 forwardly to move the ramp to the upwardly inclined position.

The dockboard also includes a conventional holddown or locking mechanism similar to that described in U.S. Pats. Nos. 3,137,017, 3,117,332 or Re. 25,249. The holddown mechanism, which is indicated generally by 23, locks the ramp in the horizontal or cross-traffic position. When the holddown mechanism is manually released by the operator by pulling on cable 24, the force of the spring 13 will then act through the lever arm 21 to pivot the ramp to the inclined position.

The dockboard also includes a mechanism for lifting the lip 12 to the partially extended position as the ramp is pivoted upwardly to the inclined position. The lip lifting and holding mechanism, indicated generally by 25 in FIG. 1, can be similar to that described in U.S. Pat. No. 3,203,002 and itself forms no part of the present invention. As described in the aforementioned U.S. Pat. as the ramp is pivoted upwardly to its inclined position, a cable 26 attached to the ramp is extended and this actuates the lip lifting mechanism to move the lip to a partially extended position. Simultaneously, a lip-holding mechanism, as described in the above mentioned patent, moves to an operative position to hold the lip in the partially extended position. The operator then walks forwardly on the ramp and the weight of the operator will overbalance the force of spring 13, thereby causing the ramp to pivot downwardly until the extension lip 12 engages the bed of the truck or carrier, thereby pivoting the lip to the fully extended position and releasing the lip-holding mechanism. The ramp holddown mechanism will then automatically lock the ramp in this position.

The front edge of the ramp may also carry a pair of safety legs 27 which are adapted to engage abutments 28 extending upwardly from the frame 6. The safety legs 27 and abutments 28 can be similar to that described in U.S. Pat. No. 3,137,017 and serve to support the ramp in the cross-traffic position as well as at a below dock level position.

According to the invention, the beams 11 each include a base member of flange 29 and the rear end 30 of each base flange is inclined upwardly and is welded to the open end of an inverted U-shaped member 31. A spacer 32 is welded between the side edge of the U-shaped member 31 and angle 22. To provide the pivotal connection between the ramp 9 and the dock 1, hinge pins 33 extend through aligned openings in lugs 34 connected to the angle 8 as well as through the central slot in the U-shaped member 31. With the slotted connection provided by the U-shaped member 31, the inner edge of the ramp can shift vertically to compensate for variations in the level of the bed of the carrier or truck, thereby enabling the ramp to tilt slightly in the event the bed of the carrier is at a slight angle to the horizontal.

Figure 3:
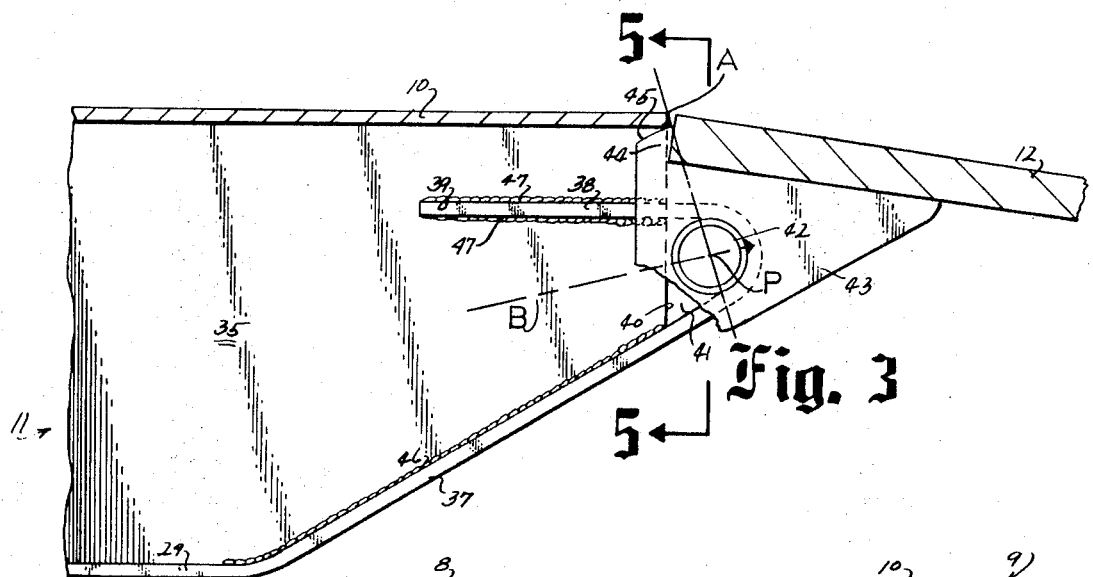
FIG. 3 is an enlarged fragmentary vertical section showing the connection of the extension lip to the ramp with the lip in an extended position.
Figure 4:
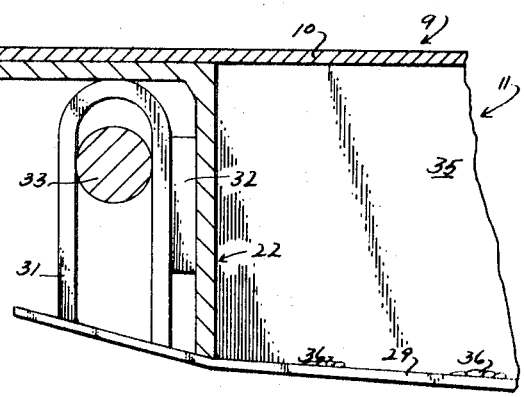
FIG. 4 is a fragmentary enlarged vertical section showing the connection of the rear edge of the ramp to the dock.
Figure 5:
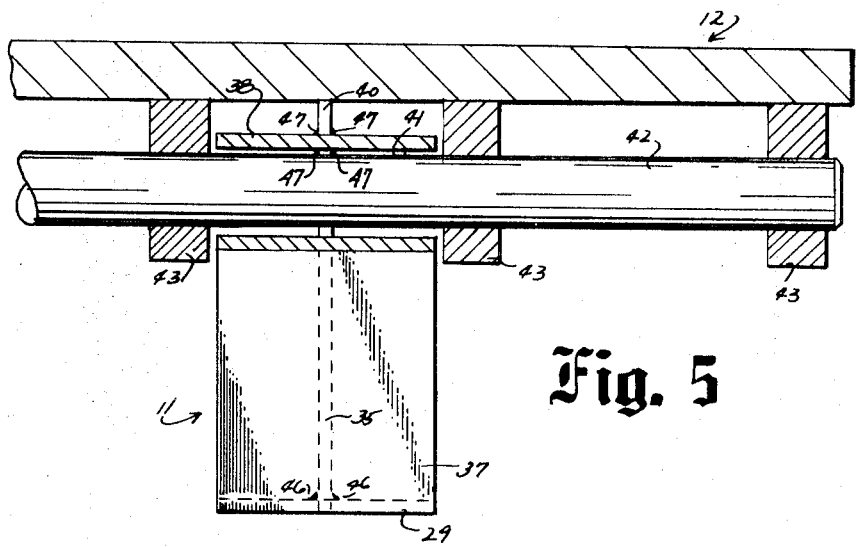
FIG. 5 is a section taken along line 5—5 of FIG. 3.

A vertical web or support member 35 is connected by a series of intermittent or skip welds 36 to the base flange 29, and the upper edge of the web 35 is welded to the tread plate 10, while the inner end of the web 35 is welded to the vertical flange of angle 22. As best shown in FIG. 3, the forward portion of the base flange 29 is provided with an upwardly inclined section 37 and the forward end of the flange has a reverse bend to provide a return section 38 that is located generally parallel to the tread plate 10 and is spaced beneath the tread plate. The vertical web 35 is provided with a central slot 39 and the return portion 38 is welded within the slot 39, or alternately return portion 38 can be provided with a central end slot into which vertical web 35 can be welded.

The forward edge 40 of web 35 is spaced from the forward or outer extremity of the base flange 29 to provide an opening 41 which receives a hinge pin 42. Pin 42 also extends through aligned openings in lip lugs 43 which are welded to the undersurface of the lip 12. With this hinge connection, the lip 12 will pivot about the axis of the hinge pins 42.

As best shown in FIG. 3, each lug 43 attached to lip 12 has a projection 44 that terminates in a curved surface 45. The curved surface 45 of each lug is in continuous engagement with the undersurface of the front edge of the tread plate 10, as the lip is moved between the pendant and extended positions. As the lugs are located at spaced intervals along the entire width of the ramp, the lugs thereby aid in supporting the front edge of the tread plate, When the lip 12 is in its extended position and is resting on the bed of a carrier, the hinge connection between the lip 12 and the ramp 9 is generally considered to be the weakest portion of the dockboard where one would normally expect failure from overloading. When a substantial load, such as that of a forklift truck, is applied to the hinged joint, the lip tends to pivot around the upper corner of the tread plate indicated by A. This loading acting through the axis of hinge pin 42 indicated by P, has a resultant force vector indicated by B which is perpendicular to a line passing between point A and point P. As best shown in FIG. 3, this vector B bisects the angle between the diagonal section 37 and the return section 38 of the base flange 29. Therefore, the welds 46 joining diagonal section 37 to both surfaces of the web 35 and the welds 47 joining the return section 38 to both faces of the web 35 will be subjected to shear as principal stress during loading conditions. Therefore, the load which is applied to the ramp will be transmitted into the beams with the sections 37 and 38 being under direct tension stress which results in the welds 46 and 47 being under direct shear stress. As it is desired to load welds in principal shear stress, this construction substantially improves the overall strength of the hinge connection between the lip and the ramp. As a further advantage, the axis P is located a greater distance from the edge A than in conventional dockboards and this increased distance lengthens the moment arm and thereby decreases the force on the hinge pin 42 and at contact point A.

The dockboard construction of the invention eliminates the usual front plate which is welded to the front edges of the supporting beams of the ramp. By eliminating the front plate, which has a substantial weight, the center of gravity of the dockboard is moved toward the rear so that a lesser spring force is required to bias the ramp to the upwardly inclined position.

Each of the welds 46 has a length approximately twice that of each of the welds 47. However, the total length of welds 46 will be approximately equal to the total length of welds 47 due to the fact that for each beam 11 there is a single weld 46 on each face of the web 35, while there are two welds 47 located on each face of the web 35, above and below the return section 38.

While web 35 is shown as a flat vertical plate, it is contemplated that structural members of various shapes or configurations can be utilized to connect the undersurface of the tread plate 10 with the base flange 29.

I claim:

1. In a dockboard adapted to be installed on a loading dock, a ramp including a tread plate, a series of beams extending in a direction from the front to the rear of the ramp and supporting said tread plate, each beam comprising a base member spaced beneath the tread plate with the forward portion of the base member extending diagonally upward and being provided with a reverse bend that terminates in a return portion disposed at an acute angle with respect to said forward portion, said beam also including a support member interconnecting the tread plate and the forward and return portions of the base member, the forward edge of the support member being spaced to the rear of said reverse bend so that said reverse bend in combination with the forward edge of said support member defines a socket, a lip hinged to the forward end of the ramp and arranged to move between an inoperative pendant position wherein the lip hangs downwardly in front of the ramp to an extended operative position wherein the lip forms an extension to said tread plate, a series of connecting members engaged with the lip and having openings therein with the openings being in alignment with the socket, and connecting means disposed within the openings in the connecting members and within the socket to provide a hinge connection for the lip to the ramp.

2. The dockboard of claim 1, wherein said support member is a generally vertical element and said return portion is a generally horizontal element, one of said elements being provided with a slot to receive the other of said elements.

3. The dockboard of claim 1, including first weld means connecting the forward diagonal portion of the base member to the support member, and second weld means connecting the return portion of the base member to the support member, said support member being substantially vertical and the forward edge of the support member terminating in substantial vertical alignment with the forward edge of the tread plate, said first and second weld means both extending rearwardly from the forward edge of the support member.

4. The dockboard of claim 3, wherein the total length of said first weld means is approximately equal to the total length of said second weld means.

5. The dockboard of claim 1, wherein said connecting members are lugs secured to the undersurface of the lip and said lugs are provided with curved surfaces disposed to support the front edge of the tread plate as the lip is pivoted between the pendant position and the extended position.

6. The dockboard of claim 1, wherein the forward extremity of the reverse bend is located forwardly of the forward edge of the tread plate and said return portion extends to the rear of the forward edge of the support member and is spaced beneath the tread plate.

7. In a dockboard adapted to be installed on a loading dock, a ramp including a generally flat tread plate, a series of beams extending in a direction from the front to the rear of the ramp and supporting said tread plate, each of said beams including a base flange with the central portion of the base flange disposed generally parallel and space beneath the tread plate and the forward portion of said base flange extending diagonally upwardly, the forward extremity of said flange projecting beyond the forward edge of the tread plate and being provided with a reverse bend, said flange terminating in a return portion disposed generally parallel to said tread plate and space beneath said tread plate, a generally vertical web secured to the undersurface of the tread plate and secured to said diagonal portion and to said return portion, the forward edge of the web being spaced to the rear of said reverse bend so that said reverse bend in combination with the forward edge of said web defines a socket, a lip hinged to the forward edge of the ramp and arranged to move between an inoperative pendant position wherein the lip hangs downwardly in front of the ramp to an extended operative position wherein the lip forms an extension to said tread plate, a series of lugs secured to the undersurface of the lip, said lugs being provided with openings disposed in alignment with the sockets in said beams, and a hinge pin extending through the openings in the lugs and through the sockets to provide a hinge connection for the lip to the ramp.

8. The dockboard of claim 7, wherein the web is disposed centrally of the width of the flange and the forward edge of the web comprises a stop to prevent rearward displacement of the hinge pin from said socket.

9. The dockboard of claim 7, including first weld means for connecting the web to the forward diagonal portion of the base flange, and second weld means for connecting the return portion of the base flange to the web, a first line normal to a second line extending between the forward edge of the tread plate and the axis of the hinge pin bisecting the angle between said diagonal portion and said return portion.

10. In a dockboard adapted to be installed on a loading dock, a ramp including a tread plate, at least one beam extending in a direction from the front to the rear of the ramp and supporting said tread plate, said beam comprising a base flange including a first portion disposed in spaced relation beneath the tread plate and a second portion disposed between said first portion and said tread plate, said base flange also including a reverse bend interconnecting said first and second portions, the forward extremity of said reverse bend projecting beyond the forward edge of the tread plate, said beam also including a supporting web interconnecting the tread plate and said first and second portions of said base flange, a forward edge of the web being spaced to the rear of said reverse bend so that said reverse bend in combination with the forward edge of the web defines a closed socket, a lip hinged to the forward end of the ramp and disposed to move between an inoperative pendant position wherein the lip hangs downwardly in front of the ramp to an extended operative position wherein the lip forms an extension to said tread plate, at least one connecting member engaged with the lip and having an opening therein with the opening being in alignment with the socket, and connecting means disposed within the opening in the connecting member and within the socket to provide a hinge connection for the lip to the ramp.